US007505169B2

(12) United States Patent
Matsuda et al.

(10) Patent No.: US 7,505,169 B2
(45) Date of Patent: Mar. 17, 2009

(54) IMAGE FORMING APPARATUS HAVING WRITING SPACE MODE

(75) Inventors: Aiko Matsuda, Osaka (JP); Yasuhiko Kida, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 914 days.

(21) Appl. No.: 10/648,633

(22) Filed: Aug. 27, 2003

(65) Prior Publication Data

US 2005/0046899 A1 Mar. 3, 2005

(51) Int. Cl.
*G06F 15/00* (2006.01)
*G06K 15/02* (2006.01)

(52) U.S. Cl. ...................................... 358/1.18; 358/1.1

(58) Field of Classification Search .................. 358/1.1, 358/1.8, 1.9, 1.13, 1.14, 1.15, 1.18, 402, 358/474, 448, 462, 537, 538; 715/204, 235; 716/11
See application file for complete search history.

(56) References Cited

U.S. PATENT DOCUMENTS 5,384,632 A * 1/1995 Nakajima et al. ............. 399/86
6,501,562 B1 * 12/2002 Nakagiri et al. .............. 358/1.2
2004/0095587 A1 * 5/2004 Brown et al. ................. 358/1.2

OTHER PUBLICATIONS

Print multiple slides on one handout page (http://office.microsoft.com/en-us/powerpoint/HA010348091033.aspx). Accessed Jun. 11, 2007.*

* cited by examiner

*Primary Examiner*—Gabriel I Garcia
(74) *Attorney, Agent, or Firm*—Smith, Gambrell & Russell, LLP

(57) ABSTRACT

An image forming apparatus in which there can be set a writing space mode in which document images in a preset number are printed on a half of a single paper sheet, thus forming a writing space on the other half of the paper sheet. This image forming apparatus is arranged to print document images in a preset number on a half of a single paper sheet when the writing space mode has been set as a copying mode.

3 Claims, 15 Drawing Sheets

IMAGE FORMING APPARATUS HAVING WRITING SPACE MODE

BACKGROUND OF THE INVENTION

1. Field of the Invention

The present invention relates to an image forming apparatus.

2. Description of Related Art

There is known an electrophotographic copying apparatus having a function of printing two or more document images on a single paper sheet. Such a function is generally called a consolidation function. However, there is conventionally no electrophotographic copying apparatus having a copying mode of printing one document image on a half of a single paper sheet, or of printing a plurality of documents on a half of a single paper sheet such that there is formed, on the other half of the paper sheet, a space in which the user can write down his or her comments.

SUMMARY OF THE INVENTION

It is an object of the present invention to provide an image forming apparatus having a copying mode in which there is formed, on a half of a paper sheet, a space in which the user can write down his or her comments.

It is another object of the present invention to provide an image forming apparatus having a copying mode in which a space is formed on a half of a paper sheet and ruled lines are printed on this space.

It is a further object of the present invention to provide an image forming apparatus arranged such that, in a consolidation mode in which a preset plurality of documents are consolidatedly printed on a single paper sheet and in which a separating line is put at each boundary between adjacent document images on the paper sheet, it is possible not to put a separating line on that blank portion of the paper sheet which is formed at the time when the number of documents to be printed on a single paper sheet is smaller than the preset number.

An image forming apparatus according to a first phase of the present invention has, as a copying mode, a writing space mode in which document images in a preset number are printed on a half of a single paper sheet, thus forming a writing space on the other half of the paper sheet. This image forming apparatus comprises: setting section to be used by the user for setting, as a copying mode, a writing space mode; and image forming section for printing document images in a preset number on a half of a single paper sheet when the writing space mode has been set as a copying mode.

The setting section may comprise means to be used by the user for setting whether or not a page separating line is put on the paper sheet when the writing space mode has been set. In such a case, the image forming section comprises means for printing a page separating line at each boundary between adjacent document images printed on the paper sheet and at the boundary between a document image printed on the paper sheet and a writing space when the writing space mode has been set as a copying mode and it has been set to put a page separating line.

The setting section may comprise means to be used by the user for setting whether or not rules are put in the writing space when the writing space mode has been set. In such a case, the image forming section comprises means for printing rules in the writing space formed on the paper sheet when the writing space mode has been set as a copying mode and it has been set to put rules in the writing space.

An image forming apparatus according to a second phase of the present invention has, as a copying mode, a consolidation mode in which a preset plurality of documents are consolidatedly printed on a single paper sheet and in which a separating line is put at each boundary between adjacent document images on the paper sheet, this consolidation mode being arranged such that the printing area of a paper sheet is divided into small sub-areas of which number corresponds to the preset document number, and that each document image is printed in each small sub-area. This image forming apparatus comprises: means for judging each pair of two adjacent small sub-areas of the printing area of a paper sheet whether or not both two adjacent small sub-areas of each pair result in blank portions when the consolidation mode has been set and the number of documents to be printed on a single paper sheet is smaller than the preset number; and means arranged not to put a separating line at the boundary between two adjacent small sub-areas when it has been judged that these two adjacent small sub-areas result in blank portions.

These and other features, objects, advantages and effects of the present invention will be more fully apparent from the following detailed description set forth below when taken in conjunction with the accompanying drawings.

BRIEF DESCRIPTION OF THE DRAWINGS

FIGS. 15A and 15B show a flow chart illustrating the steps of judging the layout type in the second writing space mode;

DESCRIPTION OF THE PREFERRED EMBODIMENTS

Figure 1:
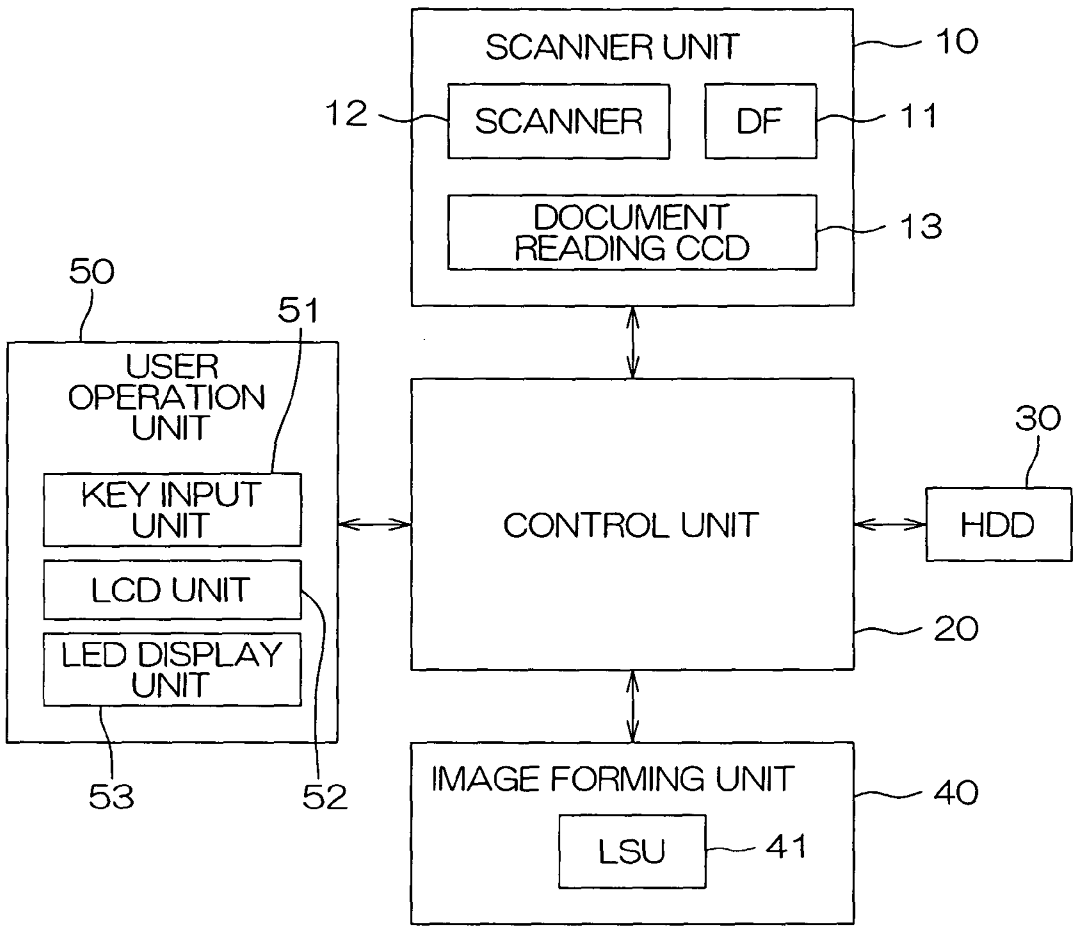
FIG. 1 is a block diagram of a digital electrophotographic copying apparatus.
Figure 2A:
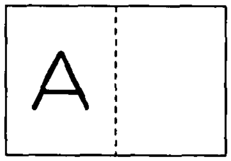
FIG. 2(*a*) to FIG. 2(*d*) are schematic views illustrating the layout types in the first writing space mode.
Figure 2B:
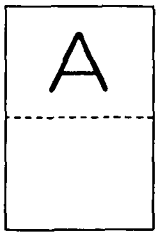
Figure 2C:
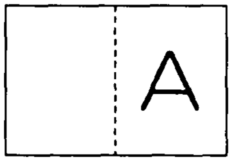
Figure 2D:
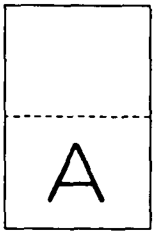
Figure 3A:
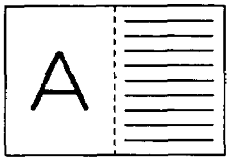
FIG. 3(*a*) to FIG. 3(*d*) are schematic views illustrating the layouts in FIG. 2(*a*) to FIG. 2(*d*) with horizontal rules inserted.
Figure 3B:
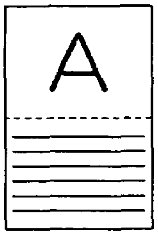
Figure 3C:
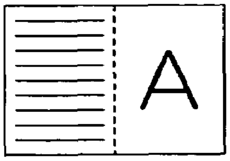
Figure 3D:
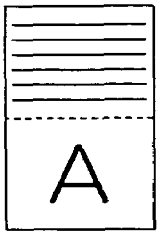
Figure 4A:
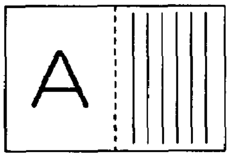
FIG. 4(*a*) to FIG. 4(*d*) are schematic views illustrating the layouts in FIG. 2(*a*) to FIG. 2(*d*) with vertical rules inserted.
Figure 4B:
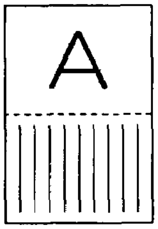
Figure 4C:
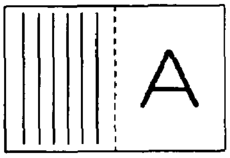
Figure 4D:
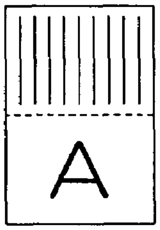
Figure 5A:
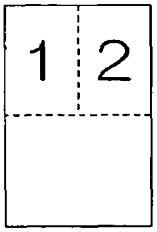
FIG. 5(*a*) to FIG. 5(*h*) are schematic views illustrating the layout types in the second writing space mode.
Figure 5B:
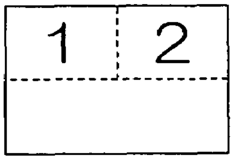
Figure 5C:
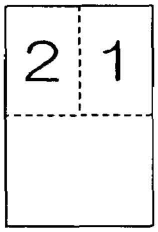
Figure 5D:
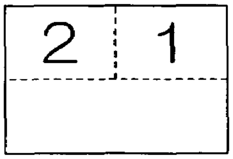
Figure 5E:
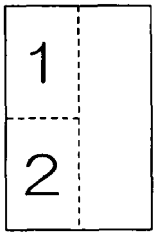
Figure 5F:
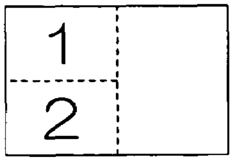
Figure 5G:
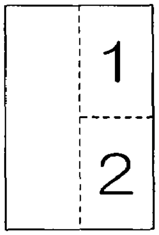
Figure 5H:
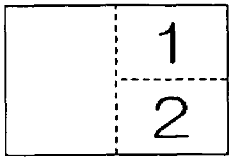
Figure 6A:
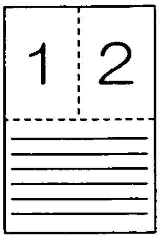
FIG. 6(*a*) to FIG. 6(*h*) are schematic views illustrating the layouts in FIG. 5(*a*) to FIG. 5(*h*) with horizontal rules inserted.
Figure 6B:
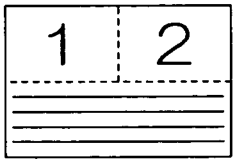
Figure 6C:
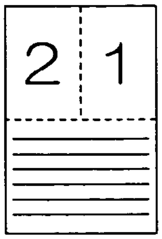
Figure 6D:
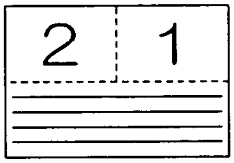
Figure 6E:
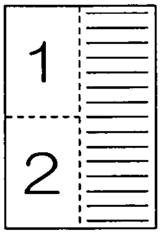
Figure 6F:
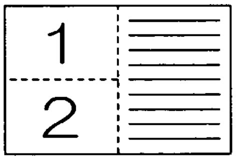
Figure 6G:
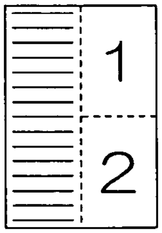
Figure 6H:
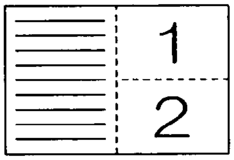
Figure 7A:
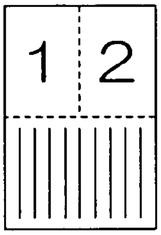
FIG. 7(*a*) to FIG. 7(*h*) are schematic views illustrating the layouts in FIG. 5(*a*) to FIG. 5(*h*) with vertical rules inserted.
Figure 7B:
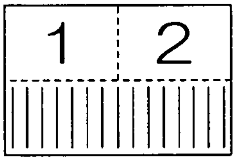
Figure 7C:
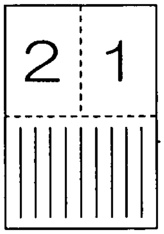
Figure 7D:
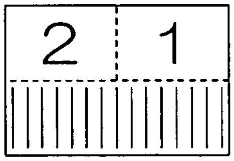
Figure 7E:
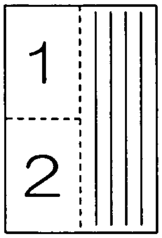
Figure 7F:
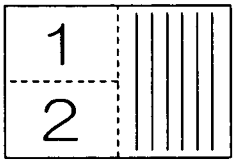
Figure 7G:
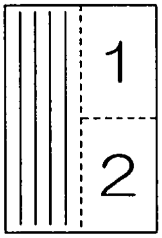
Figure 7H:
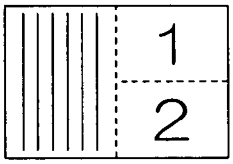

[1] Description of the Arrangement of Digital Electrophotographic Copying Apparatus FIG. 1 shows the arrangement of a digital electrophotographic copying apparatus. The digital electrophotographic copying apparatus comprises a scanner unit 10, a control unit 20, a hard disk drive (HDD) 30, an image forming unit 40 and a user operation unit 50. The scanner unit 10 has a document feeding device (DF) 11, a scanner 12, a document reading CCD 13 and the like. The control unit 20 has a CPU, a ROM, a RAM and the like.

The image forming unit 40 has a laser scan unit (LSU) 41, an electrostatic copying mechanism including a photoreceptor drum and the like. The user operation unit 50 has a key input unit 51 including a numeric key pad and a variety of keys, a liquid crystal display unit 52, an LED display unit 53 and the like.

A document sent onto a contact glass (not shown) by the document feeding device (DF) 11, is optically scanned by the scanner 12, and its document image is read by the document reading CCD 13. The document image read by the document reading CCD 13 is stored in the HDD 30 through the control unit 20. The image data stored in the HDD 30 is sent to the LSU 41 through the control unit 20. According to the image data thus sent, the LSU 41 generates laser light, and then modulates and deflects the laser light to form an electrostatic latent image on the photoreceptor.

[2] Description of a Writing Space Mode

This digital electrophotographic copying apparatus has, as a copying mode, a writing space mode capable of forming, on the copied paper sheet, a writing space in which comments are to be written.

The writing space mode chiefly comprises a first writing space mode of forming a writing space when a single document image is copied on a single paper sheet, and a second writing space mode of forming a writing space when two document images are copied on a single paper sheet.

The first writing space mode includes four layouts as shown in FIG. 2(*a*) to FIG. 2(*d*).

FIG. 2(*a*) shows a layout in which a lengthwise document image is printed on the left half of an oblong recording paper sheet (hereinafter referred to as a portrait-image first layout). FIG. 2(*b*) shows a layout in which an oblong document image is printed on the upper half of a lengthwise recording paper sheet (hereinafter referred to as a landscape-image first layout). FIG. 2(*c*) shows a layout in which a lengthwise document image is printed on the right half of an oblong recording paper sheet (hereinafter referred to as a portrait-image second layout) FIG. 2(*d*) shows a layout in which an oblong document image is printed on the lower half of a lengthwise recording paper sheet (hereinafter referred to as a landscape-image second layout).

In the first writing space mode, it is possible to select whether or not a page separating line is put at the position shown by a broken line in each of FIG. 2(*a*) to FIG. 2(*d*). Further, provision is made such that the line type (a solid line or a dotted line) can be selected when putting a page separating line. In the first writing space mode, the page separating line is put at the boundary between the document image and the writing space.

Further, it is possible to select whether or not rules are put in the writing space. When putting such rules, provision is made such that either horizontal rules or vertical rules are selected. Each of FIG. 3(*a*) to FIG. 3(*d*) shows rules printed on the writing space when the horizontal rules have been selected, while each of FIG. 4 (*a*) to FIG. 4 (*d*) shows rules printed on the writing space when the vertical rules have been selected.

As shown in FIG. 5(*a*) to FIG. 5(*h*), the second writing space mode has 8 different layouts. Out of two document images, the document image to be first read is referred to as a first document image, and the document image to be then read is referred to as a second document image. Four portions obtained by dividing, by ½, each of the length and width of a recording paper sheet, are referred to as 4-divided portions.

FIG. 5(*a*) shows a layout in which a lengthwise first document image is printed on the upper left portion out of the 4-divided portions of a lengthwise recording paper sheet, and in which a lengthwise second document image is printed on the upper right portion out of the 4-divided portions of this recording paper sheet (hereinafter referred to as a portrait-image first layout). FIG. 5(*b*) shows a layout in which an oblong first document image is printed on the upper left portion out of the 4-divided portions of an oblong recording paper sheet, and in which an oblong second document image is printed on the upper right portion out of the 4-divided portions of this recording paper sheet (hereinafter referred to as a landscape-image first layout).

FIG. 5(*c*) shows a layout in which a lengthwise first document image is printed on the upper right portion out of the 4-divided portions of a lengthwise recording paper sheet, and in which a lengthwise second document image is printed on the upper left portion out of the 4-divided portions of this recording paper sheet (hereinafter referred to as a portrait-image second layout). FIG. 5(*d*) shows a layout in which an oblong first document image is printed on the upper right portion out of the 4-divided portions of an oblong recording paper sheet, and in which an oblong second document image is printed on the upper left portion out of the 4-divided portions of this recording paper sheet (hereinafter referred to as a landscape-image second layout).

FIG. 5(*e*) shows a layout in which a lengthwise first document image is printed on the upper left portion out of the 4-divided portions of a lengthwise recording paper sheet, and in which a lengthwise second document image is printed on the lower left portion out of the 4-divided portions of this recording paper sheet (hereinafter referred to as a portrait-image third layout). FIG. 5(*f*) shows a layout in which an oblong first document image is printed on the upper left portion out of the 4-divided portions of an oblong recording paper sheet, and in which an oblong second document image is printed on the lower left portion out of the 4-divided portions of this recording paper sheet (hereinafter referred to as a landscape-image third layout).

FIG. 5(*g*) shows a layout in which a lengthwise first document image is printed on the upper right portion out of the 4-divided portions of a lengthwise recording paper sheet, and in which a lengthwise second document image is printed on the lower right portion out of the 4-divided portions of this recording paper sheet (hereinafter referred to as a portrait-image fourth layout). FIG. 5(*h*) shows a layout in which an oblong first document image is printed on the upper right portion out of the 4-divided portions of an oblong recording paper sheet, and in which an oblong second document image is printed on the lower right portion out of the 4-divided portions of this recording paper sheet (hereinafter referred to as a landscape-image fourth layout).

In the second writing space mode, it is possible to select whether or not page separating lines are put on the positions shown by the broken lines in each of FIG. 5(*a*) to FIG. 5(*h*). When putting page separating lines, provision is made such that the line type (a solid line or a dotted line) is selected. In the second writing space mode, a page separating line is put at the boundary between two document images and at the boundary between the document images and the space. Accordingly, even though the page separating line putting mode has been selected, no page separating line is put in the writing space as shown in FIG. 5(*a*) to FIG. 5(*h*). That is, if a page separating line is put in the writing space, this makes it difficult to write comments therein.

Further, it is possible to select whether or not rules are put in the writing space. When putting such rules, provision is made such that either horizontal rules or vertical rules are selected. FIG. 6(*a*) to FIG. 6(*h*) show rules printed on the writing space when the horizontal rules have been selected, while FIG. 7(*a*) to FIG. 7(*h*) show rules printed on the writing space when the vertical rules have been selected.

[3] Description of Selection Operations in the Writing Space Mode

Figure 8:
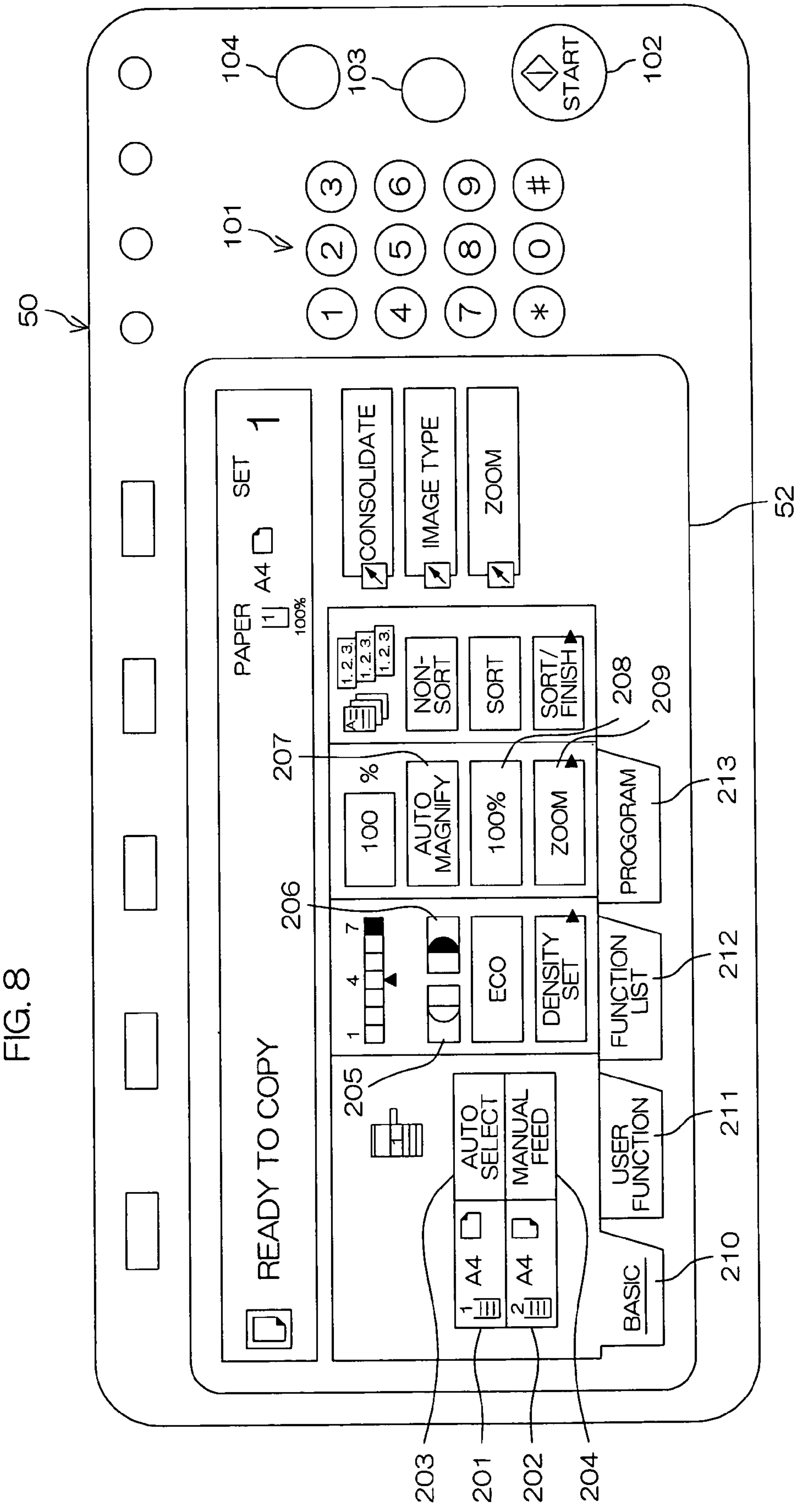
FIG. 8 is a plan view of a user operation unit.

FIG. 8 shows the user operation unit 50. The user operation unit 50 has the liquid crystal display unit 52, a numeric keypad 101, a start button 102, a clear stop button 103, a reset button 104 and the like. The liquid crystal display unit 52 is formed by a touch-panel type liquid crystal display device. The liquid crystal display unit 52 displays, as a basic screen, a screen for example shown in FIG. 8.

The basic screen comprises: paper size selection keys 201, 202 for manually selecting the paper size; an automatic paper key 203 for automatically selecting a paper sheet; a manual paper feed key 204 to be operated when using a manual feed paper sheet; density adjusting keys 205, 206 for adjusting the density; an automatic magnification key 207 for automatically selecting the magnification; an equi-magnification key 208 for setting the magnification to the equi-magnification; a zooming key 209 for reducing/enlarging the magnification; a basic key 210 for returning the screen to the basic screen; a user function key 211 for displaying the user function screen; a function list key 212 for displaying the function list screen; and a program key 213 and the like. On this basic screen, the user will set the paper size, the density, the magnification and the like.

When selecting the writing space mode, the user presses, on the basic screen, the function list key 212 to cause the function list screen to be displayed on the liquid crystal display unit 52.

Figure 9:
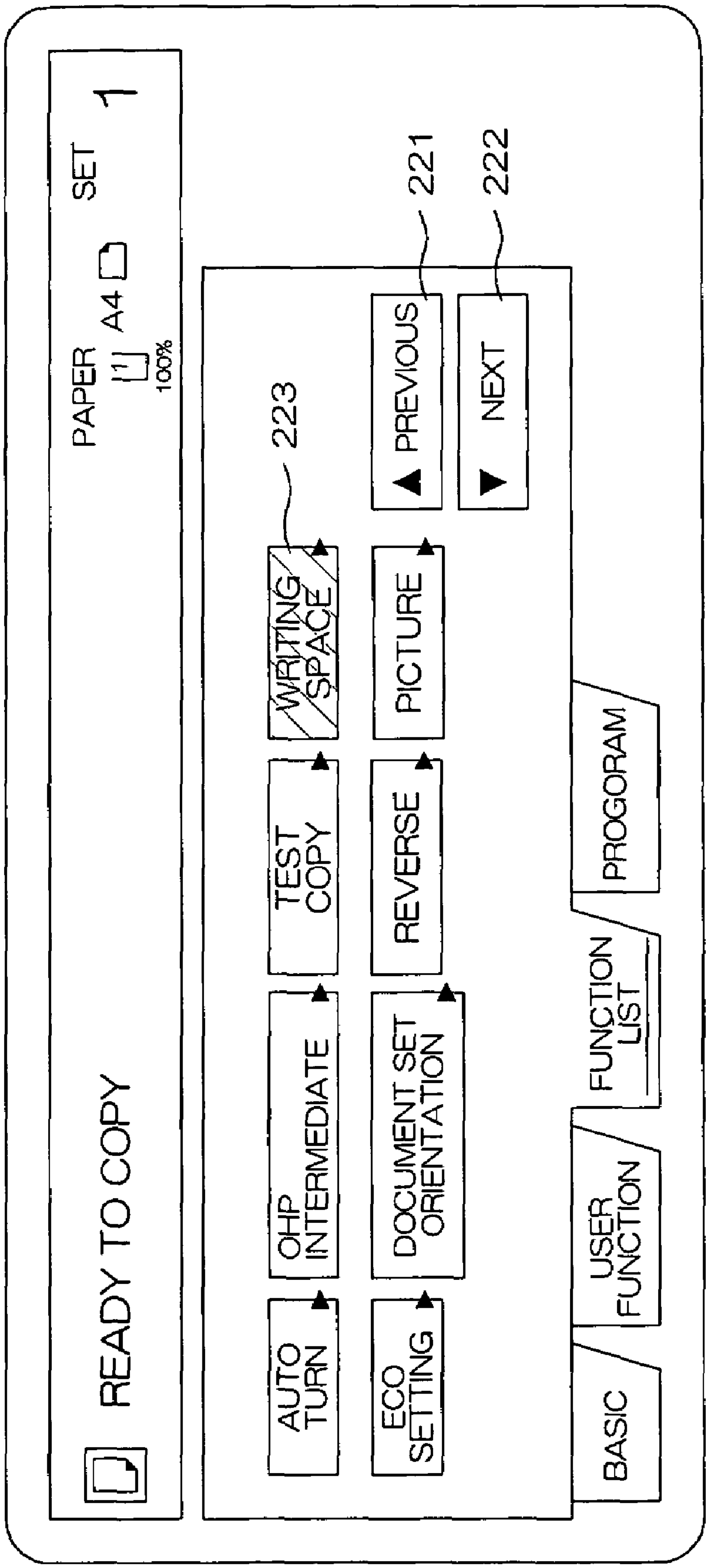
FIG. 9 is a schematic view illustrating an example of a function list screen.

FIG. 9 shows an example of the function list screen. The function list screen contains a plurality of pages and is arranged to switch the display page of the function list screen by operating the scroll keys 221, 222 thereon.

When the user operates the scroll keys 221, 222 on the function list screen, a screen containing a writing space key 223 can be displayed as shown in FIG. 9. Then, the user presses the writing space key 223.

Figure 10:
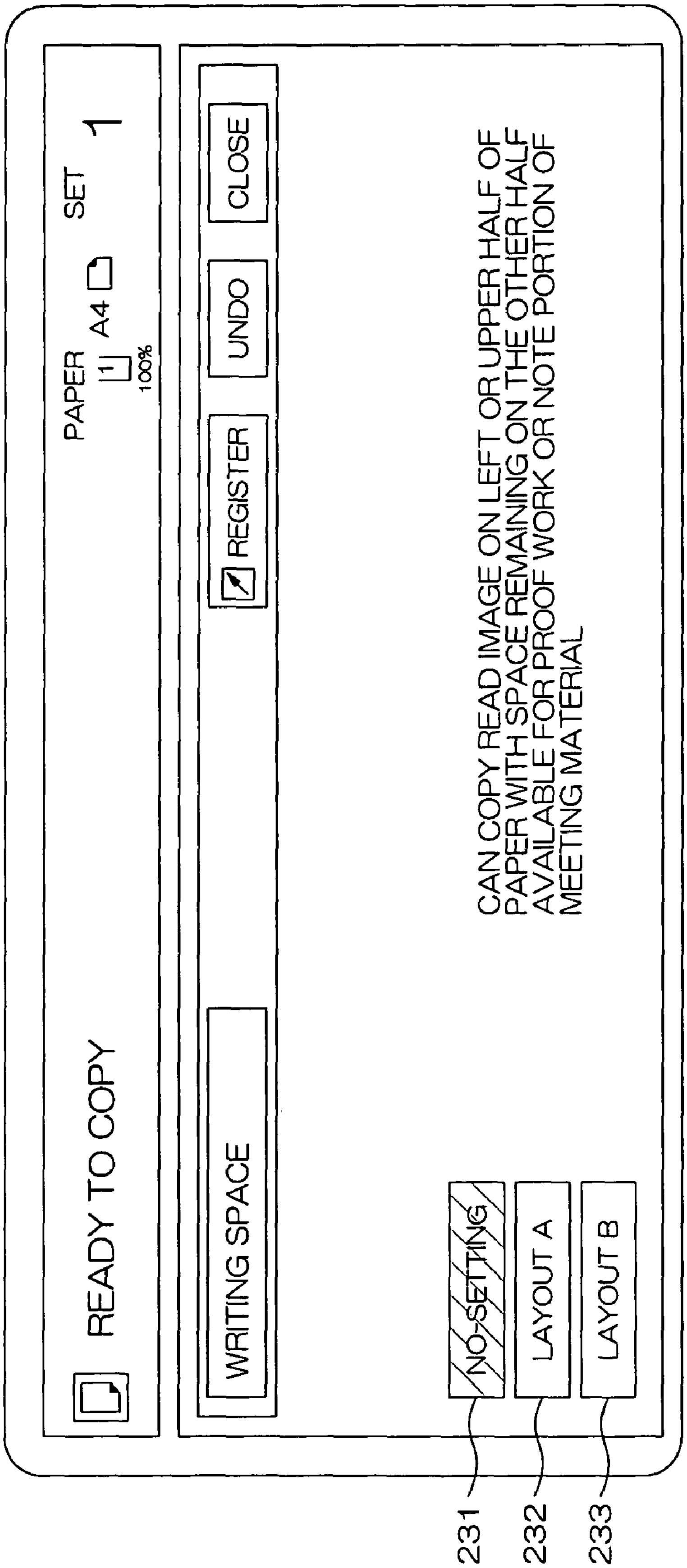
FIG. 10 is a schematic view illustrating an example of a first layout selection screen.

When the writing space key 223 is pressed, a first layout selection screen as shown in FIG. 10 is displayed on the liquid crystal display unit 52. The first layout selection screen is a screen based on which the user selects either the first writing space mode or the second writing space mode.

Displayed on the first layout selection screen are a no-setting key 231, a layout A key 232 for selecting the first writing space mode, a layout B key 233 for selecting the second writing space mode, and the like.

The user presses the layout A key 232 when desired to select the first writing space mode, and presses the layout B key 233 when desired to select the second writing space mode.

Figure 11:
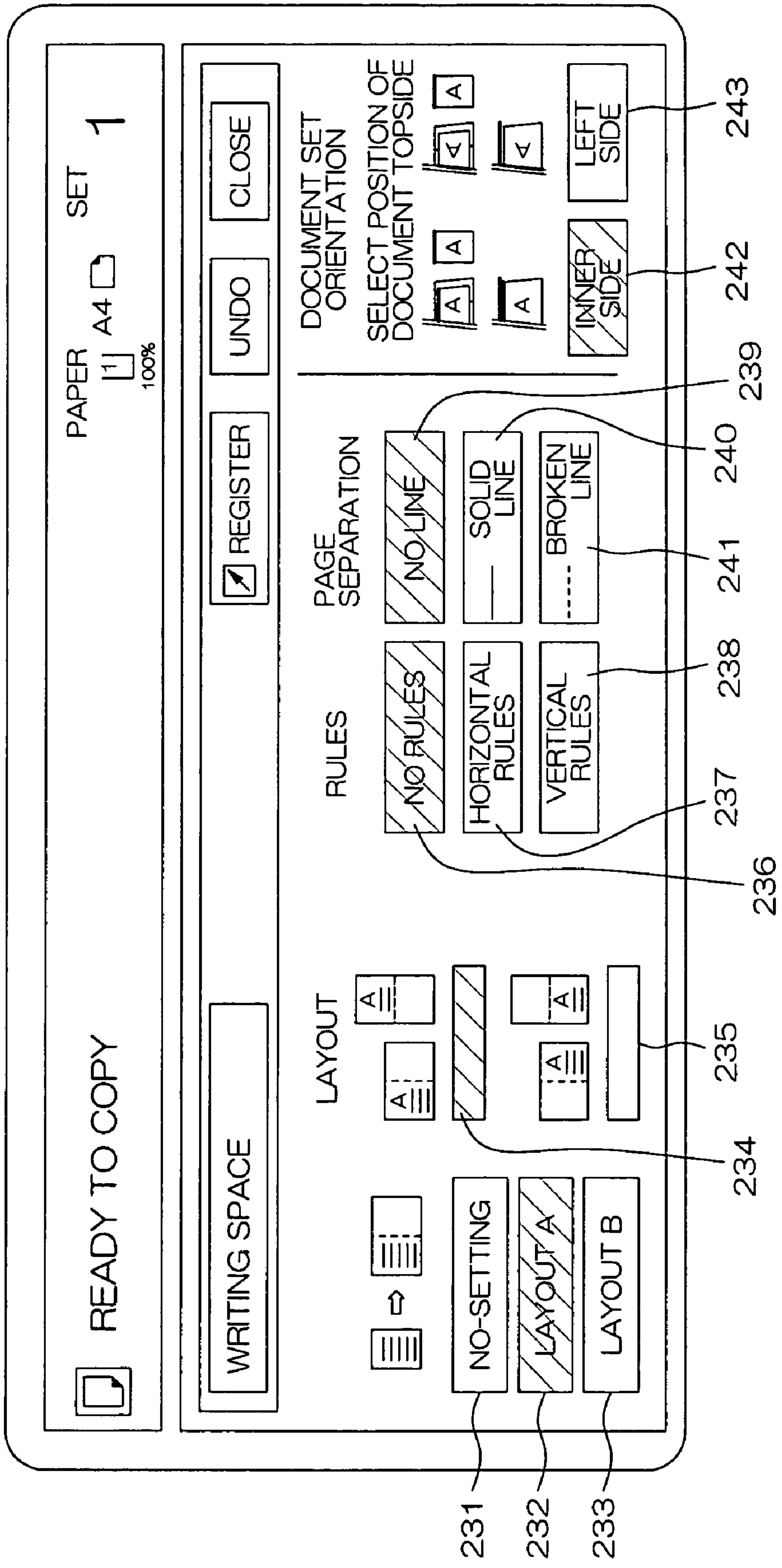
FIG. 11 is a schematic view illustrating an example of a second layout selection screen.

When the layout A key 232 is pressed, a second layout selection screen as shown in FIG. 11 is displayed on the liquid crystal display unit 52.

The second layout selection screen comprises, in addition to a no-setting key 231, a layout A key 232 and a layout B key 233, two layout selection keys 234, 235, three keys 236, 237, 238 relating to the rules, three keys 239, 240, 241 relating to the page separating line, and two keys 242, 243 for making sure of the position of the document top side.

The one layout selection key 234 is a key for selecting either the portrait-image first layout in FIG. 2(*a*) or the landscape-image first layout in FIG. 2(*b*). It is now supposed that the layout mode provided when this layout selection key 234 has been pressed, is referred to as a first layout mode. The other layout selection key 235 is a key for selecting either the portrait-image second layout in FIG. 2(*c*) or the landscape-image second layout in FIG. 2(*d*). It is now supposed that the layout mode provided when this layout selection key 235 has been pressed, is referred to as a second layout mode.

The rule-relating first key 236 is a key to be selected when putting no rules. In the default, this key 236 has been selected. The rule-relating second key 237 is a key to be selected when putting horizontal rules in the writing space as shown in FIG. 3(*a*) to FIG. 3 (*d*). The rule-relating third key 238 is a key to be selected when putting vertical rules in the writing space as shown in FIG. 4(*a*) to FIG. 4(*d*).

The first key 239 relating to the page separating line is a key to be selected when putting no page separating line. In the default, this key 239 has been selected. The second key 240 relating to the page separating line is a key to be selected when putting a page separating line in a solid line. The third key 241 relating to the page separating line is a key to be selected when putting a page separating line in a broken line.

The one key 242 for making sure of the position of the document top side, is a key to be selected when the top side of the document set on the document feeding device 11, is located in the inner part of the copying machine when viewed from the front side thereof. The other key 243 for making sure of the document setting direction, is a key to be selected when the top side of the document set on the document feeding device 11, is located in the left side of the copying machine when viewed from the front side thereof.

On the second layout selection screen in FIG. 11, the user not only selects the layout mode, but also conducts setting operations relating to the rules and the page separating line. Further, the user makes sure of the position of the document top side. Then, when the start button 102 is pressed, this starts a copying processing in the writing space mode.

Figure 12:
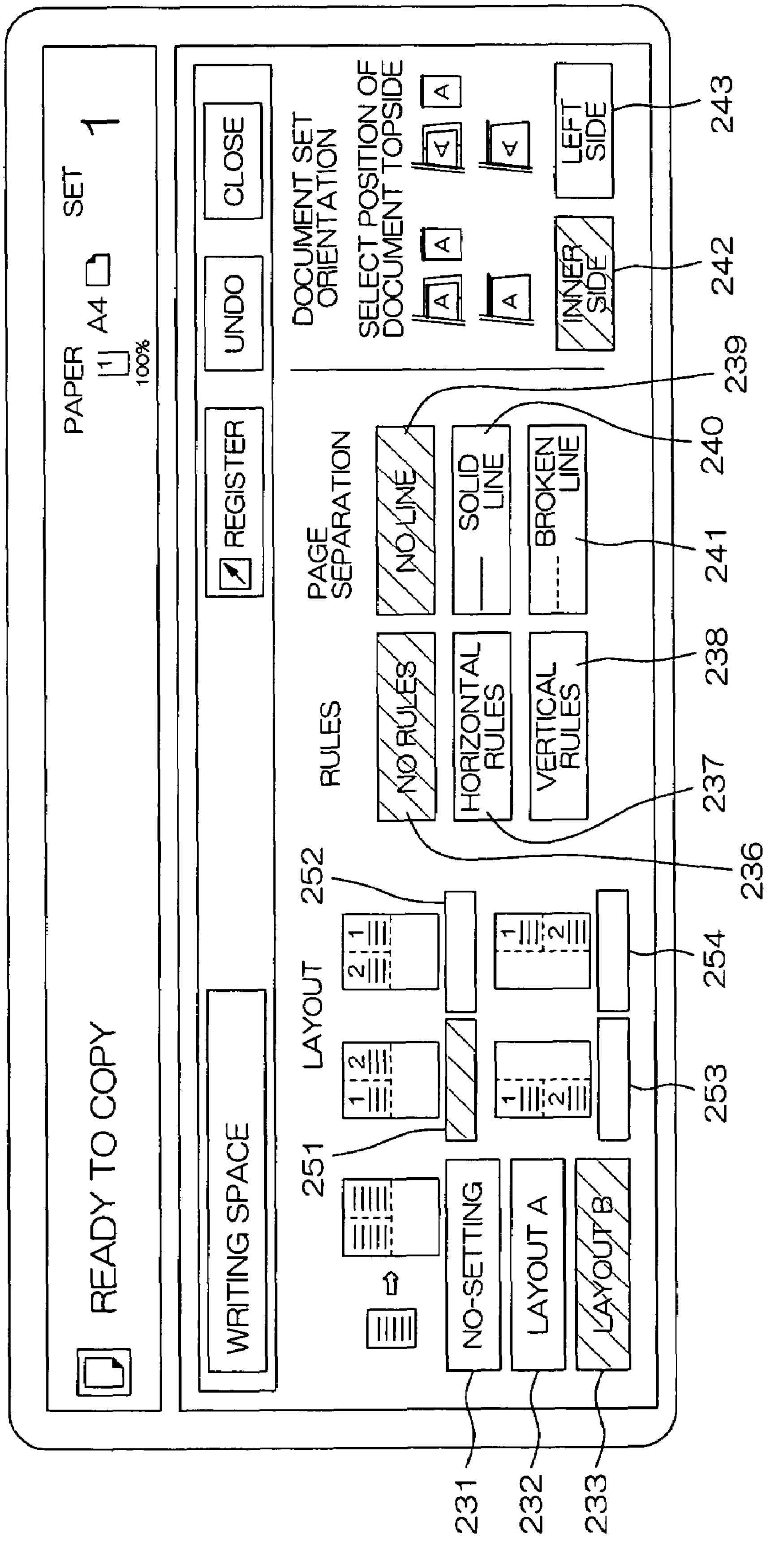
FIG. 12 is a schematic view illustrating an example of a third layout selection screen.

When the layout B key 233 is pressed on the first layout selection screen shown in FIG. 10, a third layout selection screen as shown in FIG. 12 is displayed on the liquid crystal display unit 52.

The third layout selection screen comprises, in addition to a no-setting key 231, a layout A key 232 and a layout B key 233, four layout selection keys 251, 252, 253, 254, three keys 236, 237, 238 relating to the rules, three keys 239, 240, 241 relating to the page separating line, two keys 242, 243 for making sure of the position of the document top side, and the like.

The three keys 236, 237, 238 relating to the rules, the three keys 239, 240, 241 relating to the page separating line, and the two keys 242, 243 for making sure of the position of the document top side, are the same as those discussed in connection with the second layout selection screen in FIG. 11.

The layout selection key 251 is a key for selecting either the portrait-image first layout in FIG. 5(*a*) or the landscape-image first layout in FIG. 5(*b*). It is now supposed that the layout mode provided when this key 251 has been pressed, is referred to as a first layout mode. The layout selection key 252 is a key for selecting either the portrait-image second layout in FIG. 5(*c*) or the landscape-image second layout in FIG. 5(*d*). It is now supposed that the layout mode provided when this key 252 has been pressed, is referred to as a second layout mode.

The layout selection key 253 is a key for selecting either the portrait-image third layout in FIG. 5(*e*) or the landscape-image third layout in FIG. 5(*f*). It is now supposed that the layout mode provided when this key 253 has been pressed, is referred to as a third layout mode. The layout selection key 254 is a key for selecting either the portrait-image fourth layout in FIG. 5(*g*) or the landscape-image fourth layout in FIG. 5(*h*). It is now supposed that the layout mode provided when this key 254 has been pressed, is referred to as a fourth layout mode.

On the third layout selection screen in FIG. 12, the user not only selects the layout mode, but also conducts setting operations relating to the rules and the page separating line. Further, the user makes sure of the position of the document top side. Then, when the start button 102 is pressed, this starts a copying processing in the writing space mode.

[4] Description of Steps of Copying Processing in the Writing Space Mode

Figure 13:
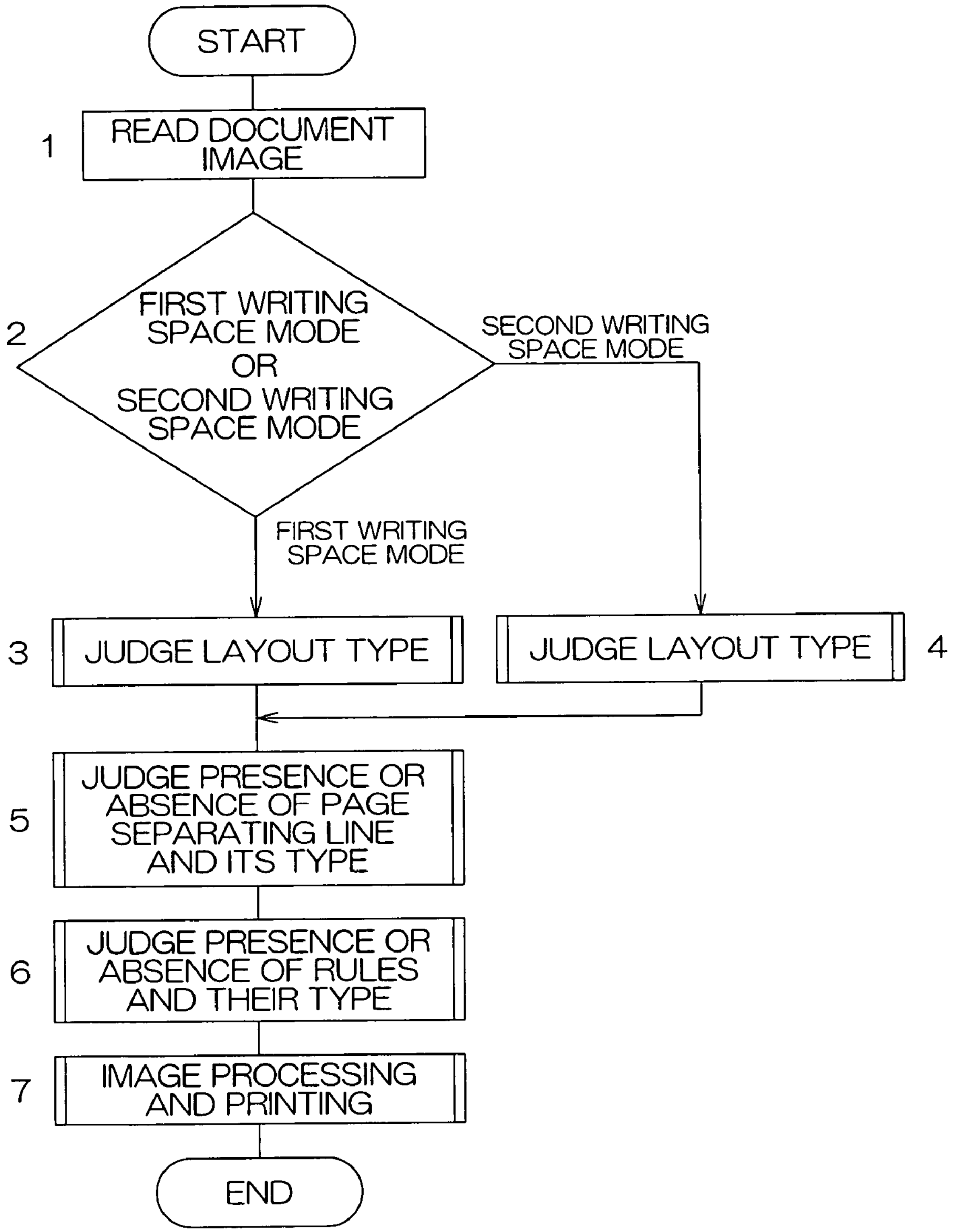
FIG. 13 is a flow chart illustrating the copying processing steps in a writing space mode.

FIG. 13 shows the copying processing steps in the writing space mode. When the start button 102 is pressed after the setting relating to the writing space mode has been made, the document image is read (Step 1). The document image thus read is stored in the HDD 30.

It is judged whether the mode is either the first writing space mode or the second writing space mode (Step 2). This judgment is made based on the key 232, 233 selected on the first layout selection screen in FIG. 10. When the mode is the first writing space mode, there is then conducted a layout type judging processing in the first writing space mode (Step 3). That is, there is executed a processing of judging which layout is the target layout, out of the layouts in FIG. 2(*a*) to FIG. 2(*d*). The sequence then proceeds to Step 5.

When the mode is the second writing space mode, there is then conducted a layout type judging processing in the second writing space mode (Step 4). That is, there is executed a processing of judging which layout is the target layout, out of the layouts in FIG. 5(*a*) to FIG. 5(*h*). The sequence then proceeds to Step 5.

At Step 5, there is executed a processing of judging the presence or absence of a page separating line, and its type. This judgment is made based on the presence or absence of a page separating line and its type selected on the second layout selection screen in FIG. 11 or the third layout selection screen in FIG. 12 (the presence or absence of a page separating line and its type selected by the keys 239, 240, 241).

Then, there is executed a processing of judging the presence or absence of rules and their type (Step 6). This judgment is made based on the presence or absence of rules and their type selected on the second layout selection screen in FIG. 11 or the third layout selection screen in FIG. 12 (the presence or absence of rules and their type selected by the keys 236, 237, 238).

Then, based on the judgment result of the layout type at Step 3 or 4, on the judgment results of the presence or absence of a page separating line and its type at Step 5, on the judgment results of the presence or absence of rules and their type at Step 6 and on the predetermined paper size, an image processing and a printing processing are executed (Step 7).

More specifically, based on the judgment result of the layout type and on the read document image, there is generated a printing document image having the position, size and direction according to the layout type. Further, based on the judgment results of the presence and absence of a page separating line and its type, it is determined whether or not a page separating line is put. In the affirmative, a page separating line image is generated based on the judgment results of the line type and the layout type. Further, based on the judgment results of the presence or absence of rules and their type, it is decided whether or not rules are put. In the affirmative, a rule image is generated based on the judgment results of the rule type (vertical rules or horizontal rules) and the layout type. Then, by combining the printing document image, the page separating line image and the rule image with one another, a printing image is generated.

Figure 14:
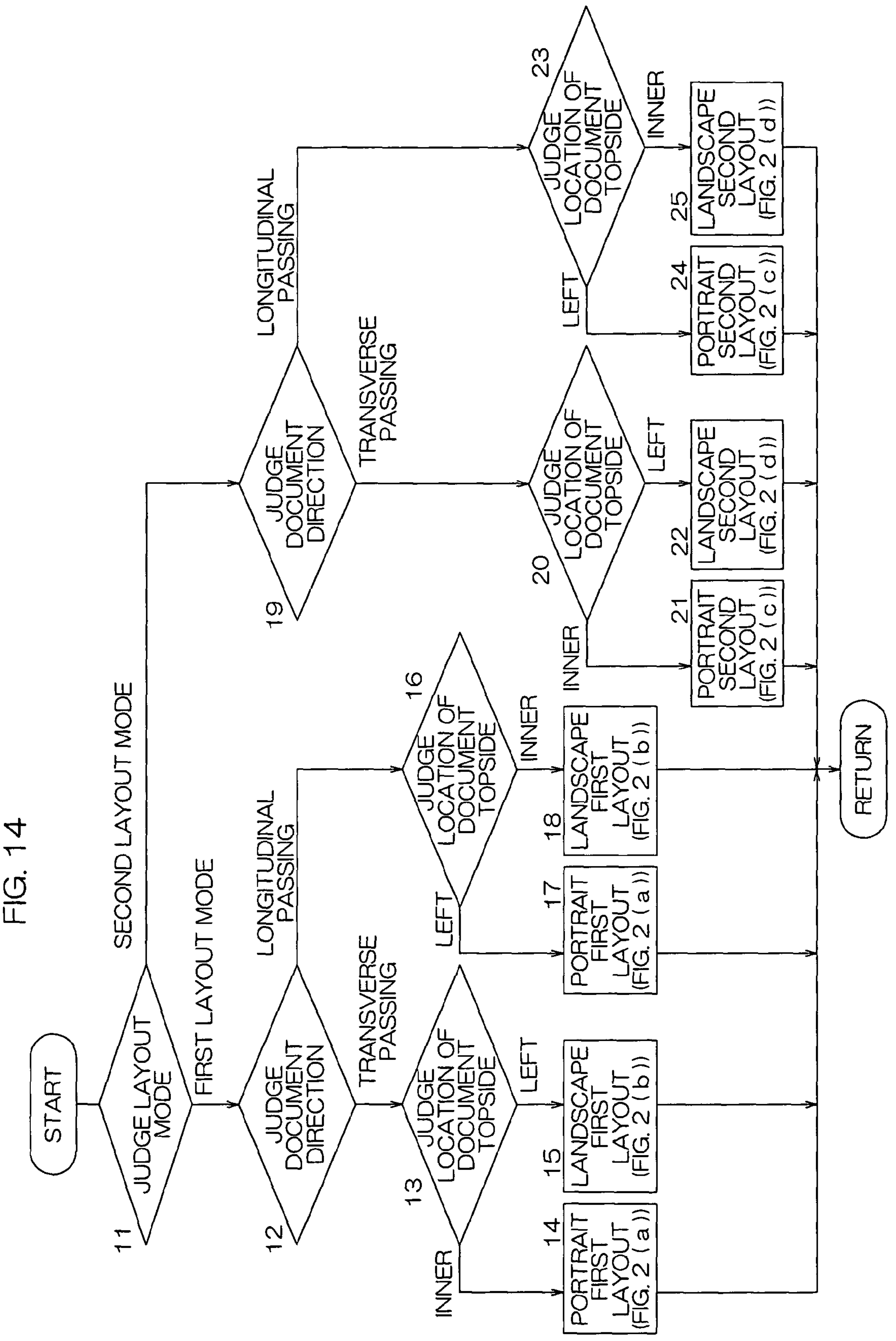
FIG. 14 is a flow chart illustrating the steps of judging the layout type in the first writing space mode.

FIG. 14 shows the steps of judging the layout type in the first writing space mode.

It is judged whether the layout mode selected by the user is the first layout mode or the second layout mode (Step 11). This judgment is made based on the layout mode selected on the second layout selection screen in FIG. 11 (the layout mode selected by the layout selection key 234, 235).

The following will discuss processings to be executed when it has been judged at Step 11 that the first layout mode is selected.

The document direction is judged (Step 12). It is now supposed that the document direction at the time when the document is fed from its longer side by the document feeding device, is referred to as "transverse passing", and that the document direction at the time when the document is fed from its shorter side by the document feeding device, is referred to as "longitudinal passing". For example, the document direction is judged in the following manner. Disposed at a predetermined plurality of positions are a plurality of sensors for detecting the presence or absence of a document. Provision is made such that light is once irradiated onto the document before the document image is read. The document direction is then judged based on the detection signals from the plurality of sensors. Based on this judgment result, the judgment at Step 12 is made.

When the document direction is "transverse passing", it is then judged whether the document top side is located in the inner part or the left side (Step 13). This judgment is made based on the document top side position selected on the second layout selection screen in FIG. 11 (the document top side position selected by the key 242, 243). When the document top side is located in the inner part, it is then judged that the layout is the portrait-image first layout in the first writing space mode as shown in FIG. 2(*a*) (Step 14). When the document top side is located in the left side, it is then judged that the layout is the landscape-image first layout in the first writing space mode as shown in FIG. 2(*b*) (Step 15).

When the document direction is "longitudinal passing" at Step 12, it is then judged whether the document top side is located in the inner part or the left side (Step 16). When the document top side is located in the left side, it is then judged that the layout is the portrait-image first layout in the first writing space mode as shown in FIG. 2(*a*) (Step 17). When the document top side is located in the inner part, it is then judged that the layout is the landscape-image first layout in the first writing space mode as shown in FIG. 2(*b*) (Step 18).

The following will discuss processings to be executed when it has been judged at Step 11 that the second layout mode was selected.

The document direction is judged (Step 19). When the document direction is "transverse passing", it is then judged whether the document top side is located in the inner part or the left side (Step 20). When the document top side is located in the inner part, it is then judged that the layout is the portrait-image second layout in the first writing space mode as shown in FIG. 2(*c*) (Step 21). When the document top side is located in the left side, it is then judged that the layout is the landscape-image second layout in the first writing space mode as shown in FIG. 2(*d*) (Step 22).

When the document direction is "longitudinal passing" at Step 19, it is then judged whether the document top side is located in the inner part or the left side (Step 23). When the document top side is located in the left side, it is then judged that the layout is the portrait-image second layout in the first writing space mode as shown in FIG. 2(*c*) (Step 24). When the document top side is located in the inner part, it is then judged that the layout is the landscape-image second layout in the first writing space mode as shown in FIG. 2(*d*) (Step 25).

Figures 15, 15A:
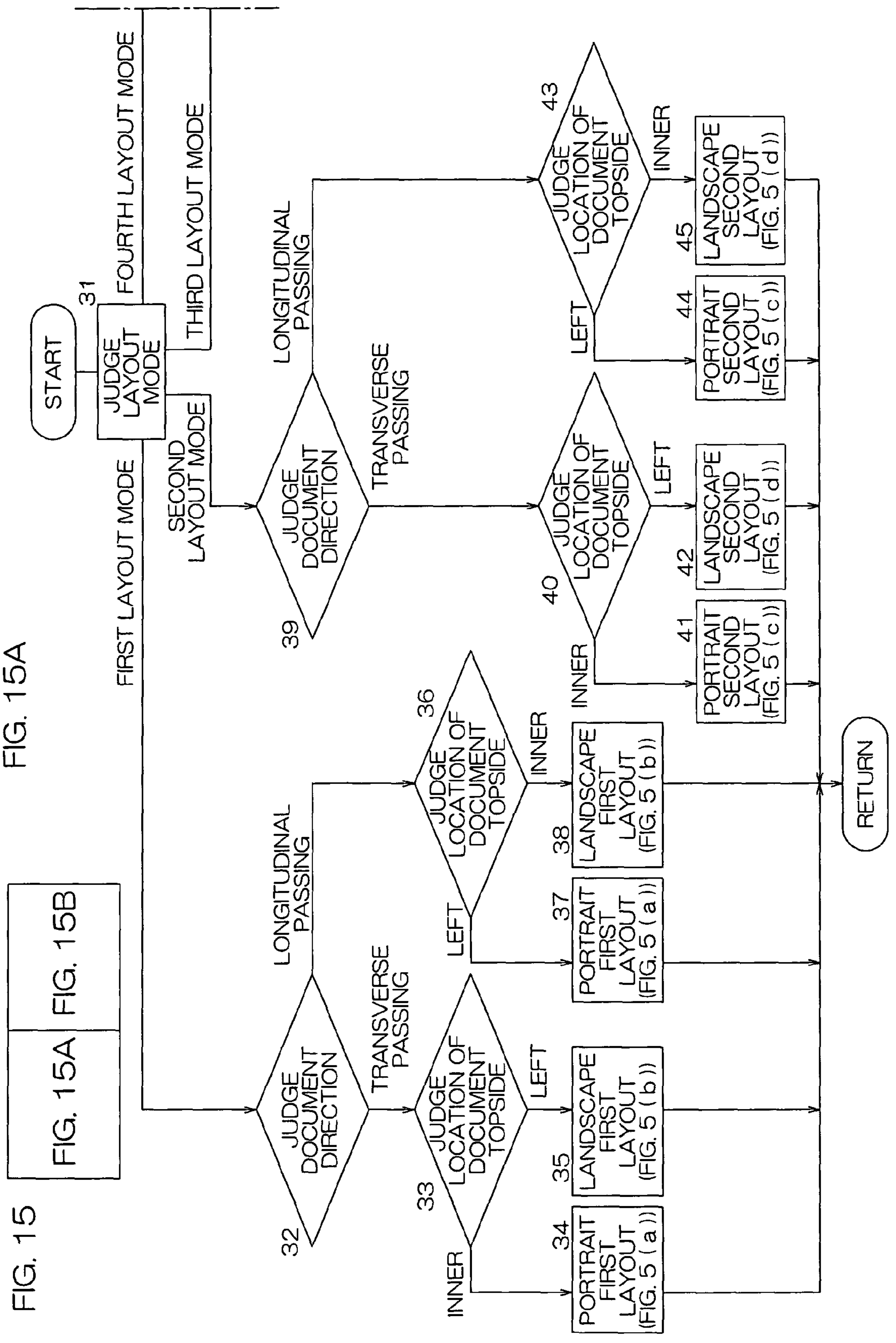
FIG. 15 illustrates how
FIGS. 15A and 15B are combined.
Figure 15B:
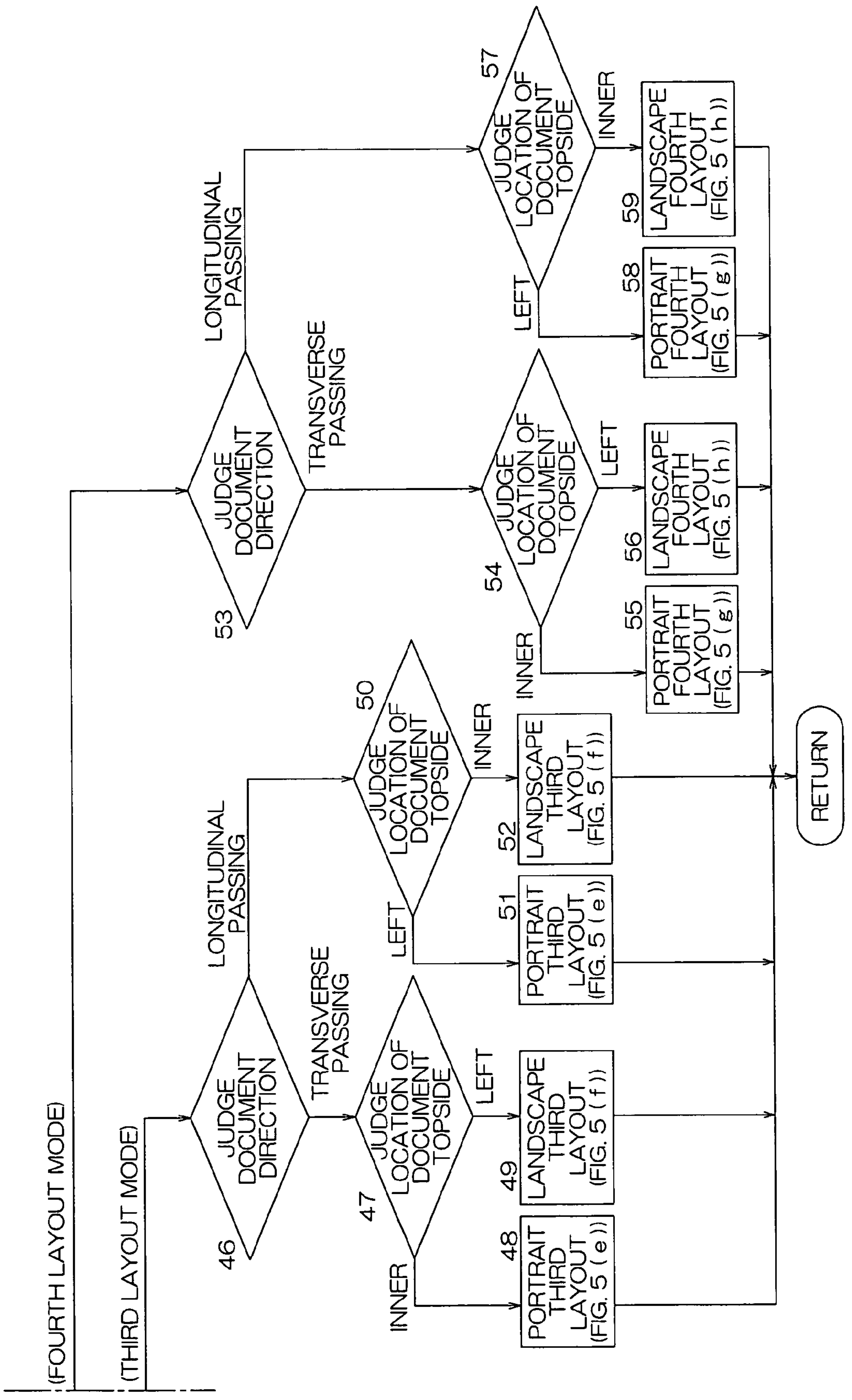

FIGS. 15A and 15B show the steps of judging the layout type in the second writing space mode.

It is judged which layout mode is the layout mode selected by the user, out of the first to fourth layout modes (Step 31). This judgment is made based on the layout mode selected on the third layout selection screen in FIG. 12 (the layout mode selected by the layout selection key 251, 252, 253, 254).

The following will discuss processings to be executed when it has been judged at Step 31 that the first layout mode was selected.

Each document direction is judged (Step 32). When the document direction is "transverse passing", it is then judged whether the document top side is located in the inner part or the left side (Step 33). This judgment is made based on the document top side position selected on the third layout selection screen in FIG. 12 (the document top side position selected by the key 242, 243). When the document top side is located in the inner part, it is then judged that the layout is the portrait-image first layout in the second writing space mode as shown in FIG. 5(*a*) (Step 34). When the document top side is located in the left side, it is then judged that the layout is the landscape-image first layout in the second writing space mode as shown in FIG. 5(*b*) (Step 35).

When the document direction is "longitudinal passing" at Step 32, it is then judged whether the document top side is located in the inner part or the left side (Step 36). When the document top side is located in the left side, it is then judged that the layout is the portrait-image first layout in the second writing space mode as shown in FIG. 5(*a*) (Step 37). When the document top side is located in the inner part, it is then judged that the layout is the landscape-image first layout in the second writing space mode as shown in FIG. 5(*b*) (Step 38).

The following will discuss processings to be executed when it has been judged at Step 31 that the second layout mode was selected.

Each document direction is judged (Step 39). When the document direction is "transverse passing", it is then judged whether the document top side is located in the inner part or the left side (Step 40). When the document top side is located in the inner part, it is then judged that the layout is the portrait-image second layout in the second writing space mode as shown in FIG. 5(*c*) (Step 41). When the document top side is located in the left side, it is then judged that the layout is the landscape-image second layout in the second writing space mode as shown in FIG. 5(*d*) (Step 42).

When the document direction is "longitudinal passing" at Step 39, it is then judged whether the document top side is located in the inner part or the left side (Step 43). When the document top side is located in the left side, it is then judged that the layout is the portrait-image second layout in the second writing space mode as shown in FIG. 5(*c*) (Step 44). When the document top side is located in the inner part, it is then judged that the layout is the landscape-image second layout in the second writing space mode as shown in FIG. 5(*d*) (Step 45).

The following will discuss processings to be executed when it has been judged at Step 31 that the third layout mode was selected.

Each document direction is judged (Step 46). When the document direction is "transverse passing", it is then judged whether the document top side is located in the inner part or the left side (Step 47). When the document top side is located in the inner part, it is then judged that the layout is the portrait-image third layout in the second writing space mode as shown in FIG. 5(*e*) (Step 48). When the document top side is located in the left side, it is then judged that the layout is the landscape-image third layout in the second writing space mode as shown in FIG. 5(*f*) (Step 49).

When the document direction is "longitudinal passing" at Step 46, it is then judged whether the document top side is located in the inner part or the left side (Step 50). When the document top side is located in the left side, it is then judged that the layout is the portrait-image third layout in the second writing space mode as shown in FIG. 5(*e*) (Step 51). When the document top side is located in the inner part, it is then judged that the layout is the landscape-image third layout in the second writing space mode as shown in FIG. 5(*f*) (Step 52).

The following will discuss processings to be executed when it has been judged at Step 31 that the fourth layout mode was selected.

Each document direction is judged (Step 53). When the document direction is "transverse passing", it is then judged whether the document top side is located in the inner part or the left side (Step 54). When the document top side is located in the inner part, it is then judged that the layout is the portrait-image fourth layout in the second writing space mode as shown in FIG. 5(*g*) (Step 55). When the document top side is located in the left side, it is then judged that the layout is the landscape-image fourth layout in the second writing space mode as shown in FIG. 5(*h*) (Step 56).

When the document direction is "longitudinal passing" at Step 53, it is then judged whether the document top side is located in the inner part or the left side (Step 57). When the document top side is located in the left side, it is then judged that the layout is the portrait-image fourth layout in the second writing space mode as shown in FIG. 5(*g*) (Step 58). When the document top side is located in the inner part, it is then judged that the layout is the landscape-image fourth layout in the second writing space mode as shown in FIG. 5(*h*) (Step 59).

[5] Description of Modifications

There is known an electrophotographic copying apparatus having the consolidation copying function that a plurality of documents are reduced in size and consolidatedly printed on a single recording paper sheet. In such consolidation copying, adjacent document images printed on the recording paper sheet can be separated by a solid line, a dotted line or the like.

For example, there are instances where separating lines are to be put in a 4-in-1 consolidation mode in which four document images are consolidatedly copied on a single recording paper sheet. In such a case, if there are for example six documents of which number is not a multiple of 4, a blank portion containing no document image is formed on the last recording paper.

For example, there are instances where the number of documents is six in a 4-in-1 consolidation mode in which four document images are successively copied in the order of the upper left, upper right, lower left and lower right portions out of the 4-divided portions of a recording paper sheet. In such a case, as shown in FIG. 16, blank portions are formed in the lower left and lower right portions out of the 4-divided portions of the last recording paper sheet.

Figure 16:
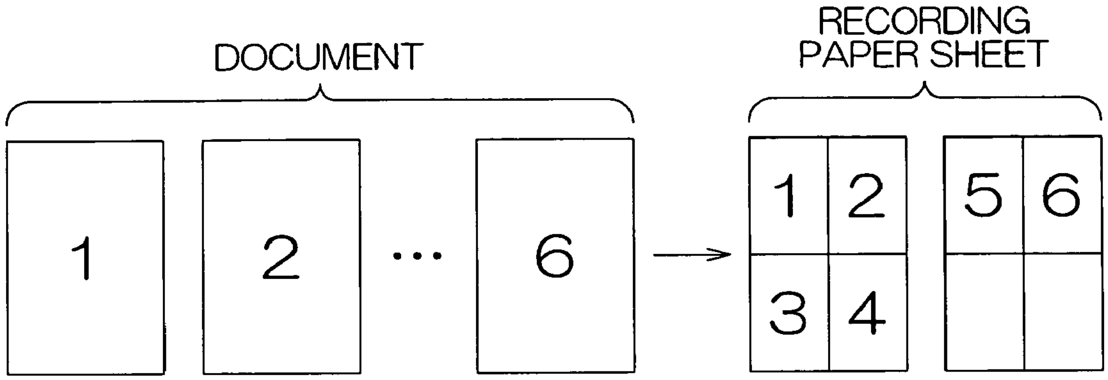
FIG. 16 is a schematic view illustrating a conventional printing result obtained when it has been set to put a separating line in a 4-in-1consolidation mode.
Figure 17:
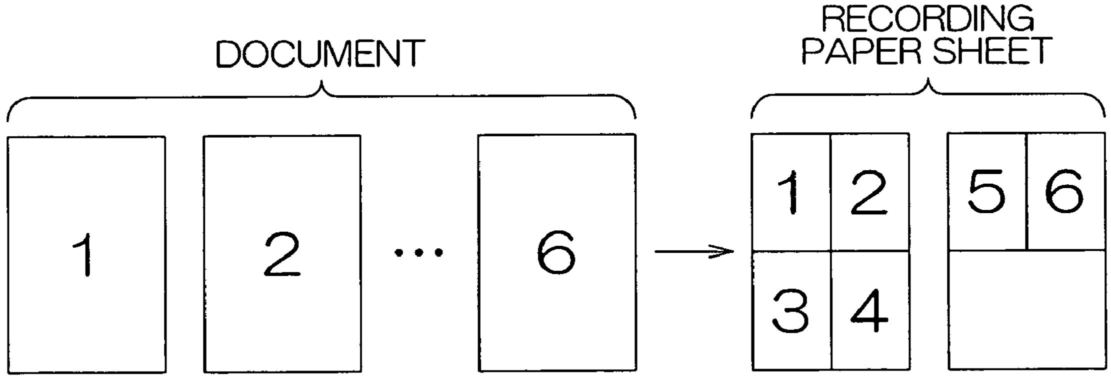
FIG. 17 is a schematic view illustrating a printing result, according to an embodiment of the present invention (modification), obtained when it has been set to a put separating line in a 4-in-1 consolidation mode.

In prior art, when provision has been made such that separating lines are put, a separating line is put also between the blank portions as shown in FIG. 16. According to a modification of the present invention, however, provision may be made such that no separating line is put between the blank portions on the last recording paper sheet as shown in FIG. 17. It is noted that the user can set in which order the document images are printed in the 4-divided portions of a recording paper sheet.

Figure 18:
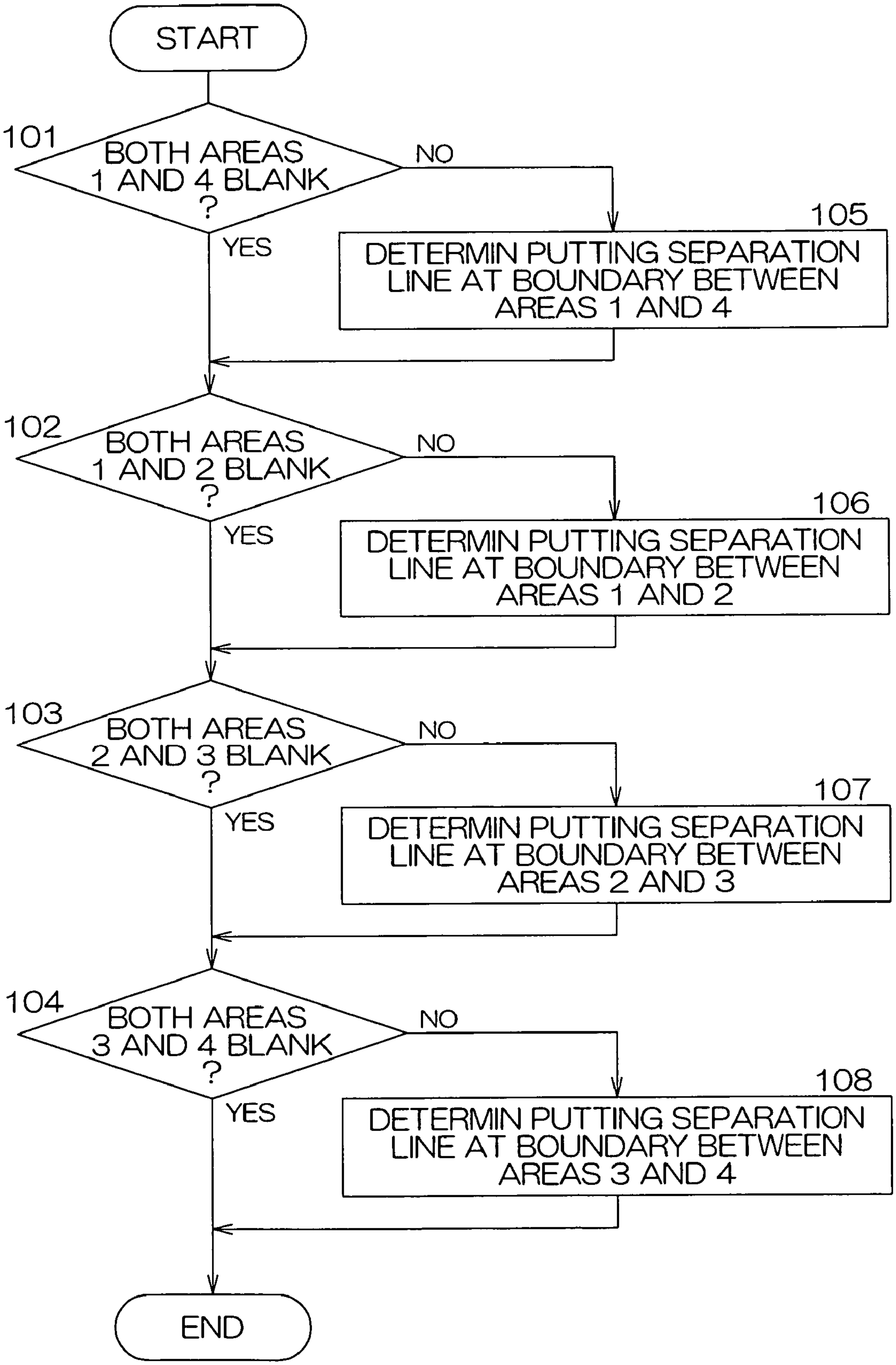
FIG. 18 is a flow chart illustrating the steps of determining a separating line putting place when it has been set to put a separating line in a 4-in-1 intensive mode.

FIG. 18 shows the steps of determining a separating line putting place when it has been set to put separating lines in a 4-in-1 consolidation mode.

Figure 19:
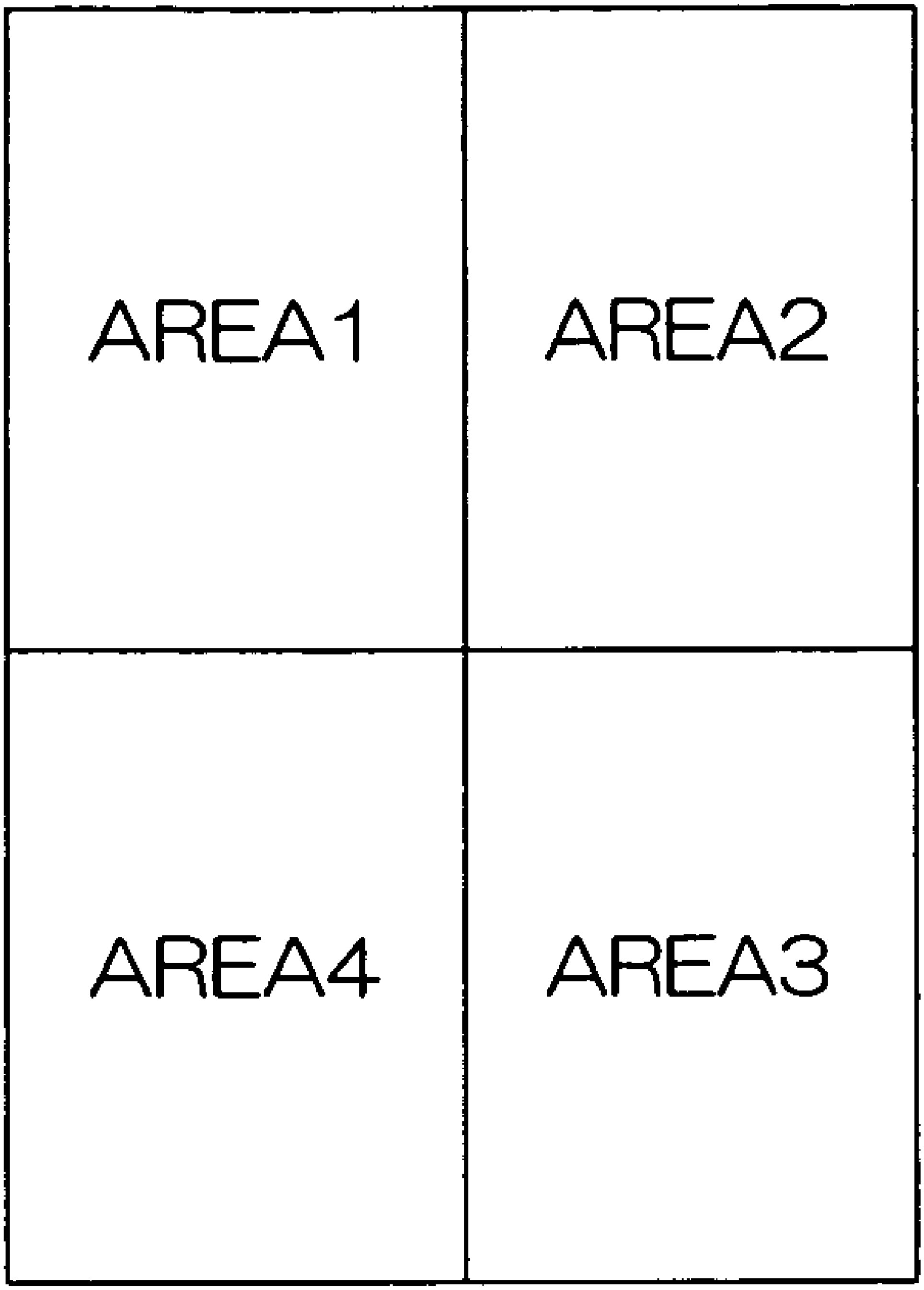
FIG. 19 is a schematic view illustrating the 4-divided portions of a recording paper sheet.

First, as shown in FIG. 19, the 4-divided portions of a recording paper sheet are respectively defined as Area 1, Area 2, Area 3 and Area 4. More specifically, the upper left portion out of the 4-divided portions is defined as Area 1, the upper right portion out of the 4-divided portions as Area 2, the lower right portion out of the 4-divided portions as Area 3, and the lower left portion out of the 4-divided portions as Area 4.

There are successively executed a judgment of whether or not both Area 1 and Area 4 result in blank portions (whether documents to be printed on both Areas 1 and 4, are present or not)(Step 101), a judgment of whether or not both Area 1 and Area 2 result in blank portions (Step 102), a judgment of whether or not both Area 2 and Area 3 result in blank portions (Step 103), and a judgment of whether or not both Area 3 and Area 4 result in blank portions (Step 104).

When it has been judged at the judgment processing at Step 101 that both Area 1 and Area 4 do not result in blank portions, it is determined that a separating line is put at the boundary between Area 1 and Area 4 (Step 105). When it has been judged at the judgment processing at Step 102 that both Area 1 and Area 2 do not result in blank portions, it is determined that a separating line is put at the boundary between Area 1 and Area 2 (Step 106). When it has been judged at the judgment processing at Step 103 that both Area 2 and Area 3 do not result in blank portions, it is determined that a separating line is put at the boundary between Area 2 and Area 3 (Step 107). When it has been judged at the judgment processing at Step 104 that both Area 3 and Area 4 do not result in blank portions, it is determined that a separating line is put at the boundary between Area 3 and Area 4 (Step 108).

Accordingly, when all Areas 1 to 4 do not result in blank portions, a separating line is put at each boundary between adjacent Areas. Further, when only one Area results in a blank portion, a separating line is also put at each boundary between adjacent Areas. Further, when only one pair of a pair of Areas 1 and 3 on a diagonal line and a pair of Areas 2 and 4 on a diagonal line, results in blank portions, a separating line is also put at each boundary between adjacent Areas.

When both two transversely or vertically adjacent Areas result in blank portions, no separating line is put at the boundary between these adjacent areas.

Embodiments of the present invention have been discussed in detail, but these embodiments are mere specific examples for clarifying the technical contents of the present invention. Therefore, the present invention should not be construed as limited to these specific examples. The spirit and scope of the present invention are limited only by the appended claims.

This Application corresponds to Japanese Patent Application Serial No. 2002-253424 filed on Aug. 30, 2002 with Japanese Patent Office, the disclosure of which is incorporated herein by reference.

What we claim is:

1. An image forming apparatus, comprising:

a setting section to be used by an operator for setting, as a copying mode, a writing space mode in which a document image in a preset number are printed on a half of a single paper sheet, thus forming a writing space for a comment on the other half of the paper sheet;

a document top side setting section arranged to accept the operator's input designating a position of a top side of a document;

a document direction judging section arranged to determine a direction of the document;

a layout determination section arranged to determine a layout of the document image and the writing space on a paper sheet based on the operator's input accepted by the document top side setting section and the direction of the document judged by the document direction judging section; and an image forming section for printing the document image in the preset number on a half of a single paper sheet, in accordance with the layout determined by the layout determination section, when the writing space mode has been set as a copying mode.

2. An image forming apparatus according to claim 1, wherein the setting section includes means to be used by the operator for setting whether or not a page separating line is put on the paper sheet when the writing space mode has been set, and the image forming section includes means for printing a page separating line at each boundary between adjacent document images printed on a paper sheet and at each boundary between a document image printed on the paper sheet and the writing space, when the writing space mode has been set as a copying mode and it has been set to put a page separating line.

3. An image forming apparatus according to claim 1, wherein the setting section includes means to be used by the operator for setting whether or not rules are put in the writing space when the writing space mode has been set, and the image forming section includes means for printing rules in the writing space formed on the paper sheet when the writing space mode has been set as a copying mode and it has been set to put rules in the writing space.

* * * * *